United States Patent Office 3,499,040
Patented Mar. 3, 1970

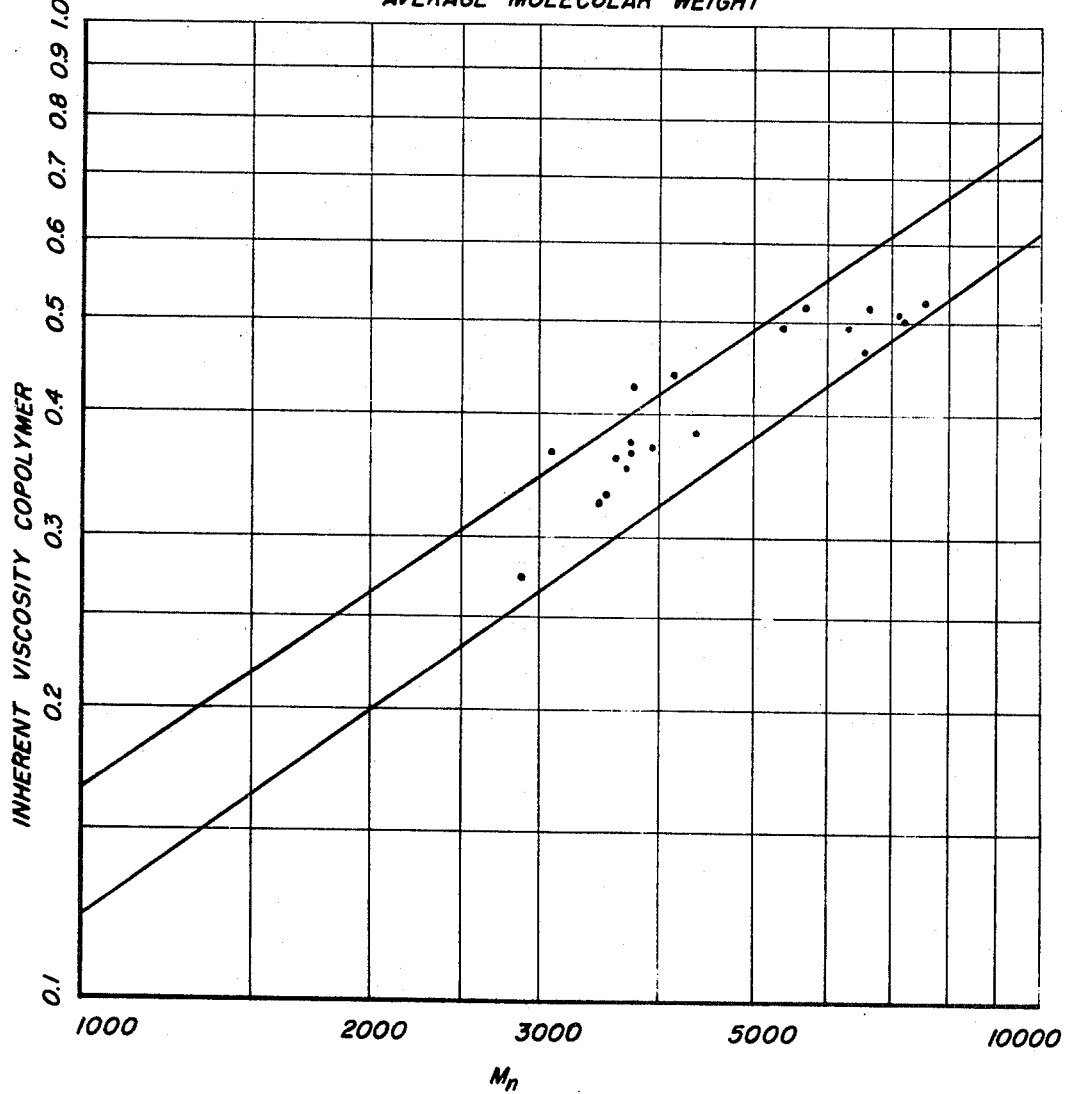

3,499,040
COPOLYMERIC ETHER GLYCOL AND PROCESS
FOR ITS MANUFACTURE
Theodore E. Stanin, William H. Seaton, and Robert E. Gee, Kingsport, Tenn., assignors to Eastman Kodak Company, Rochester, N.Y., a corporation of New Jersey
Filed Dec. 14, 1964, Ser. No. 417,856
Int. Cl. C07c 43/18
U.S. Cl. 260—611
7 Claims

ABSTRACT OF THE DISCLOSURE

Copolymers of tetramethylene glycol and 8-oxabicyclo (4.3.0)nonane or 3 - methyl - 8 - oxabicyclo(4.3.0)nonane having a percent deviation of molecular weight of less than 30 percent are prepared by terminating the polymerization reaction after a time period of from 2 to 60 minutes and before the reaction has reached a state of equilibrium.

---

This invention relates to copolymers of tetramethylene glycol, hereinafter called TMG, and 8-oxabicyclo-[4:3:0] nonane, hereinafter called OBN, or 3-methyl-8-oxabicyclo [4:3:0]nonane, hereinafter referred to as MOBN, said copolymers having a narrow molecular weight distribution and their manufacture.

The use of poly(tetramethylene glycol), hereinafter called PTMG, for various purposes is well known in the art. A particularly advantageous use is described in the copending Bell, Kibler and Smith application, Ser. No. 215,768, filed Aug. 9, 1962, and now Patent No. 3,261,812 which relates to elastomeric polyesters wherein PTMG is one constituent.

Copolymers of TMG and OBN or MOBN are described and claimed in copending Lappin application Ser. No. 231,588, filed Oct. 18, 1962 and now Patent No. 3,381,038 wherein the molecular weight distribution is as would be normally expected.

The present application is based upon the discovery described in the same applicants' Ser. No. 239,684 filed Nov. 23, 1962 and now abandoned as applied to the copolymers of said Ser. No. 231,588.

For any specific average molecular weight, a polymer (including a copolymer) with a narrow molecular weight distribution will have fewer molecules per unit of mass than will the same polymer with the same average molecular weight but with a broad molecular weight distribution. This results in improved heat resistance because the melting temperature and sticking temperature are affected by molal concentrations. The properties of an elastomeric polyester will therefore be enhanced by a narrow molecular weight distribution for the polymer or copolymer from which it is derived.

When the logarithm of intrinsic viscosity is plotted versus the logarithm of molecular size for a series of homologous monodisperse polymers, there frequently results a straight line relationship, as explained by Arthur V. Tobolsky, Properties and Structure of Polymers, John Wiley and Sons, Inc., 1960, p. 301. Since viscosity increases exponentially with molecular weight as explained by Wallace R. Gambill, How To Calculate Liquid Viscosity, Chemical Engineering, Jan. 12, 1959, p. 128, it follows that for a polydisperse polymer, the intrinsic viscosity will be greater than the intrinsic viscosity of a mono-disperse sample of the same material with the same number average molecular weight. Consequently, the amount by which the intrinsic viscosity of a polydisperse sample deviates from the intrinsic viscosity of a monodisperse sample (of the same number-average molecular weight) may be used as a measure of the broadness of the molecular weight distribution of the polydisperse sample.

It has been found convenient for the present purposes to use inherent viscosity instead of the more commonly used intrinsic viscosity. In the concentrations and molecular weight ranges used in this work, this substitution makes practically no difference in the results. It has also been found convenient to define the "percent deviation $\delta$," as $$\delta = \frac{\{\eta\} - \{\eta_0\}}{\{\eta_0\}} 100$$

where $\{\eta\}$ is the inherent viscosity of a polydisperse sample and $\{\eta_0\}$ is the inherent viscosity of a monodisperse sample of the same molecular weight. Inherent viscosity is defined as $$\{\eta\} = \frac{\ln t/t_0}{C}$$

wherein $t$=time required for a solution of 1.00 gram of polymer in 100.0 ml. of mixed solvent to flow through a capillary viscometer: $t_0$=time required for the mixed solvent alone to flow through the viscometer: $C$=1.00 gram polymer per 100.0 ml. solvent. The mixed solvent used in this work consisted of 40 parts by weight of tetrachloroethane and 60 parts by weight of phenol in which 0.1 part of cadmium acetate was present as a hydrogen scavenger.

A measure of the molecular weight distribution of the copolymers of TMG and OBN and/or MOBN may be obtained by measuring the inherent viscosity $\{\eta\}$ of the copolymer and comparing it with that of another sample having the same number-average molecular weight $M_n$. The copolymer with the lower $\{\eta\}$ has the narrower molecular weight distribution. The $\{\eta\}$ can be plotted against the $M_n$ for a number of samples on a log-log plot and the relative breadth of the molecular weight distribution of a number of samples can be thus compared. Examples are illustrated in FIG. 1 which is more fully explained hereinbelow.

It is an object of this invention to provide as an improved composition of matter, copolymers of tetramethylene glycol (TMG) and either or both of 8-oxabicyclo-[4:3:0]nonane (OBN) and/or 3-methyl-8-oxabicyclo-[4:3:0]nonane (MOBN), said copolymers having a narrow molecular weight distribution.

It is a further object to provide a process for the manufacture of such improved copolymers of TMG and OBN and/or MOBN.

Other objects are apparent elsewhere in this specification.

In the polymerization of tetrahydrofuran (THF) in admixture with OBN and/or MOBN in the presence of catalysts such as fluosulfonic acid (FSA), the percent deviation of the growing copolymer may be plotted versus the reaction time as a means of evincing the relative broadness of the molecular weight distribution. It has been discovered that when this is done, the percent deviation $\delta$, adjusts rapidly to a relatively low value, remains at a relatively low value for a period of time, then it abruptly and quite unexpectedly undergoes a relatively large increase in value. It has been further found that the amount of time allowable before this abrupt increase in $\delta$ occurs is dependent on the nature of the catalyst, the catalyst concentration and the reaction temperature. Therefore, the exact number-average molecular weight obtained can be varied over a wide range and the exact value of $\delta$ may be varied over a somewhat limited range of values without passing the point at which $\delta$ undergoes its abrupt increase in value.

As an example of the above described phenomenon reference is invited to FIG. 2 of said Ser. No. 239,684 which presents a plot of $\delta$ versus the reaction time for 100.0 grams of tetrahydrofuran being polymerized at 40° C. by 2.0 grams of fluosulfonic acid. The number-average molecular weight is also plotted in said FIG. 2 versus the reaction time to further clarify the manner in which the number-average molecular weight develops during the polymerization. It is therefore apparent that the reaction times described by the processes developed heretofore are generally far in excess of the reaction time employed in accordance with this invention.

The molecular weight of the copolymers of TMG and OBN and/or MOBN resulting from the polymerization of tetrahydrofuran and OBN and/or MOBN with a catalyst is affected by a number of variables such as the proportion of the catalyst, the temperature of the polymerization, etc. At a given temperature and proportion of the catalyst, the molecular weight of the resultant TMG copolymer first increases rapidly to a maximum and then falls off gradually to an essentially constant value. The polymerization may be stopped at any arbitrary point to recover a copolymer of a desired molecular weight. Shorter times employing higher proportions with respect to catalyst will give higher molecular weights, and it is possible within the range of normal operating conditions to obtain copolymer of molecular weights of from 750 to 4000 with maximum conversion of the tetrahydrofuran, OBN and/or MOBN of about 65 percent.

When using an acid catalyst such as a fluosulfonic acid, the copolymer is converted, at least in part, to esters. If the copolymer is to be used to prepare polyesters, it is desirable to hydrolyze these ester groups. Since the viscosity of the TMG copolymer may be quite high, the hydrolysis is accomplished by drowning the mass in hot water under vigorous agitation or it can be accomplished by a continuous cocurrent drowning in a turbulent flow tube using steam as the propelling force. Ordinarily the amount of steam and water employed should be at least half of the weight of the polymer and up to four times the weight of water may be used if a more dilute TMG copolymer is desired.

The unreacted tetrahydrofuran, OBN and/or MOBN removed from this aqueous dispersion by steam stripping in a conventional stripping column, using a temperature of about 100° C. at the bottom of the column to somewhat over 65° C. at the top. In distilling off the unreacted constituents, it is sometimes desirable to add an antioxidant to the aqueous dispersion of the copolymer during the distillation to inhibit the formation of peroxides and carbonyl groups in the copolymer. Usually from 0.10 percent to 1 percent of antioxidant, such as phenyl-β-naphthylamine, can advantageously be employed.

In the polymerization step, catalysts such as fluorosulfonic acid, chlorosulfonic acid, pyrosulfuric acid, ferric chloride, aluminum chloride, tin tetrachloride, or other types of acidic catalysts can advantageously be used. A large list of such catalysts have been described. Other antioxidants such as diphenyl-p-phenylene diamine, phenyl-α-naphthyl-amine, di-β-naphthyl-p-phenylene diamine, di-tert-butyl-p-cresol, 2,5-di-tertiary-butyl hydroquinone, 2,2'-methylene bis(6-tertiary-butyl-p-cresol), 6,6'-methylene di-2,4-xylenol or similar antioxidants can also be used.

The TMG copolymer as it comes from the stripping column may be separated as an upper layer with a lower aqueous acid layer being formed. The copolymer layer may still contain some water and acidic products such as HF and $H_2SO_4$, the greater portion of which can be washed from the polymer by agitation with water.

After a reasonable amount of washing, there may still be some residual acidity which is detrimental in the use of this copolymer product for the preparation of elastomers. This can be readily removed by stirring the copolymer with an aqueous slurry of calcium hydroxide, using from about 0.25 to 5.0 parts (preferably 1 part) of calcium hydroxide to 100 parts of the copolymer.

The washing of the acid from the copolymer and subsequent neutralization can be readily carried out in a continuous process. The filtration can be carried out in the usual line type filters.

According to the present invention, as has now been explained, it has been discovered, quite unexpectedly, that a copolymer of more desirable characteristics can be made quite readily by interrupting the polymerization of reactants at some point short of equilibrium. That is, before the relative amounts of monomer and polymer in the reacting solution become constant at a definite temperature, pressure and catalyst concentration.

The polymerization can be conducted quite easily in a continuous manner as in the following examples which also illustrate the advantage of a high length to inside diameter ratio in the reactor.

This invention can be further illustrated by the following examples which include preferred embodiments thereof although it will be understood that these examples are included merely for purposes of illustration and are not intended to limit the scope of the invention unless otherwise specifically indicated:

EXAMPLE A

Using a reactor of small length to diameter ratio

This example is more fully set forth in said Ser. No. 239,684 and is for the purpose of comparison. Tetrahydrofuran and fluosulfonic acid were pumped into a refrigerated mixing chamber at 83.8 cc./min. and 2.01 cc./min., respectively, and from there into a 4 inch stainless steel pipe 4 feet long equipped with an agitator and baffles positioned in such a manner to form compartments so that a minimum of back mixing occurred. The temperature was maintained at 41° C. The average time required for the material to pass through the reactor was 2.7 hours. The material then passed into a pipe where it contacted an excess of steam. The unpolymerized tetrahydrofuran was then steam stripped from the polymer and condensed together with the excess steam in a water cooled condenser and collected in a receiver. The stripped homopolymer was collected in a receiver for a period of 16 hours and then subjected to further steaming to completely hydrolyze the acid end groups. After several water washes and treatment with calcium hydroxide followed by filtration and drying under vacuum, PTMG was obtained as a viscous liquid which solidified to a white, waxy solid at about 38° to 42° C. The number-average molecular weight measured ebulliometrically was 2986 and the $\{\eta\}$ was 0.37 measured as a 1 percent solution in a mixture of 60 percent phenol and 40 percent tetrachloroethane at about 25° C. By reducing the reaction time to below 60 minutes the number-average molecular weight was reduced and the deviation percentage was brought down to under 15 percent in most cases; however, improved results were obtained when the reactor employed had a large length to diameter ratio (L./D.) as in Example B as follows:

EXAMPLE B

Using reactor of large length to diameter ratio

This example is also set forth in said Ser. No. 239,684, and is for purpose of comparison. In this example a different design of the main reactor was employed. It consisted of 100 feet of ½ inch O.D. copper tubing formed into a coil. The coil was immersed in a water bath maintained at a constant temperature of 40° C. Tetrahydrofuran was pumped into the mixing chamber at the rate of 179.04 ml./min. and fluosulfonic acid was pumped in at the rate of 4.05 ml./min. The mixture passed through the copper coil at an average retention time of 16 min. The polymerized mixture was treated as in Example A. The product from 11.5 hours of collection weighed 113.5 pounds and it had a number-average molecular weight of 2900 and an inherent viscosity of 0.32.

Temperatures of 20 to 65° C. can be advantageously employed and the reactor can advantageously have an L./D. of from 50 to 10,000 preferable being at least 500.

The foregoing Examples A and B merely serve to illustrate process details for making improved copolymers as well as homopolymers. The control of molecular weight in these processes depends upon the control of temperature, relative feed rates of acid and reactants, and retention or residence time. Variations in any one of these factors results in variation in molecular weight and inherent viscosity. Precise data relating these factors obtained from operating experience show a distinct difference in the molecular weight distribution between materials made at short retention times and those at long retention times.

The following three Examples C, D and E illustrate copolymers made in a normal way at relatively high conversions which have a broad molecular weight distribution.

EXAMPLE C

Two thousand and thirty (2,030) grams of a dry solution of 6 mole percent 8-oxabicyclo[4.3.0]nonane in tetrahydrofuran was placed in a nitrogen-purged, 5-l. flask and chilled to −20 to −30° C. Then 57.8 ml. of fluosulfonic acid was carefully added. The solution was stirred for two hours under nitrogen at 35° C. Then 1,670 cc. of water were added and the excess of unpolymerized tetrahydrofuran and oxabicyclononane were steam distilled from the polymer. The polymer was then further separated from the water by draining. The polymer was washed repeatedly with hot water several times. The crude polymer was then dissolved in an equal volume of toluene and treated with a slurry of calcium hydroxide in 2,000 cc. water with stirring for ½ hr. The slurry was filtered, the water layer separated by decanting, and the toluene solution heated under vacuum to remove all traces of toluene and water. There were obtained 862 g. of viscous polymer which was fluid at room temperature. The inherent viscosity was 0.430; the number average molecular weight was 3,740; the amount of 8-oxabicyclononane introduced into the polymer was 5.5 mole percent as determined by NMR; and the conversion to polymer was 45%.

EXAMPLE D

This polymer was prepared as described for Example C except that the polymerization was terminated after 1 hr. and 20 min. with the following results: obtained 1,059 g. of polymer; number average molecular weight was 4,140; inherent viscosity $\{\eta\}$ 0.446; 5.8 mole percent OBN introduced; conversion was 52%.

EXAMPLE E

Same as Examples C and D except that the duration of the reaction was 140 min.; yield 927 g.; number average molecular weight 3,010; $\{\eta\}$ 0.370; mole percent OBN, 6.5; conversion 46%.

The following Examples 1–16 illustrate preparation of copolymers according to the invention with narrow molecular weight distribution.

EXAMPLE 1

This example describes the preparation of a copolymer of tetrahydrofuran and 8-oxabicyclo[4.3.0]nonane with a narrow molecular weight distribution in a continuous reactor.

A dry solution of 11.3% by weight of 8-oxabicyclo-[4.3.0]nonane (80% trans) in tetrahydrofuran was pumped at the rate of 14.37 lb./hr. into a loop of jacketed pipe with refrigerated brine flowing through the jacket. The loop included a circulating pump for agitation. At the same time a stream of fluosulfonic acid was metered into this loop at the rate of 0.855 lb./hr. The temperature of the material in the loop was maintained at −5 to −10° C.

The mixture from the loop overflowed into a coil of ½" O.D. copper tubing 112 ft. long, vol. 0.874 gal. immersed in a constant temperature water bath. The residence time in this section was 26.1 min. approximately.

The polymerized solution was then passed into a continuous steam stripping still where the unreacted monomers were separated from the polymer and collected for recovery. The wet stripped polymer was collected separately in another vessel for a period of 24 hr. and then freed from acid by neutralization with lime and freed from water by azeotroping with toluene. Finally it was decolorized with active carbon and clay and received as a clear, nearly colorless, viscous liquid. The product weighed 107.1 lb.; the conversion was 30.8%; $\{\eta\}$, 0.36; number average molecular weight 3,700.

Additional examples of copolymers with narrow molecular weight distribution are listed as Examples 2–8 in Table I. All of these were made essentially as described in Example 1.

TABLE I.—CONTINUOUS COPOLYMERIZATION OF THF AND OBN

| Example No. | Temp., °C. | Monomer feed rate, lb./hr. | Wt. percent trans OBN in feed | Wt. percent fluosulfonic acid | Residence time, min. | Wt. percent OBN in copolymer | Percent convn. | $\{\eta\}$ | $\overline{M}_n$ |
|---|---|---|---|---|---|---|---|---|---|
| 2 | 35 | 14.6 | 11.3 | 5.9 | 26.0 | 13.1 | 34.7 | .376 | 3,900 |
| 3 | 35 | 14.1 | 11.3 | 5.0 | 27.1 | | 26.9 | .357 | 3,700 |
| 4 | 35 | 13.6 | 11.3 | 5.2 | 28.1 | 13.1 | 23.6 | .335 | 3,500 |
| 5 | 35 | 12.0 | 14.7 | 6.0 | 30.1 | 13.4 | 35.9 | .359 | 3,680 |
| 6 | 35 | 14.0 | 14.7 | 6.0 | 24.3 | 13.3 | 25.6 | .33 | 3,480 |
| 7 | 35 | 14.0 | 14.7 | 5.8 | 19.1 | 13.8 | 16.9 | .275 | 2,942 |
| 8 | 35 | 13.2 | 14.7 | 5.8 | 40.0 | 13.2 | 40.7 | .388 | 4,350 |

Example F listed in Table II represents compositions with number average molecular weights between 5,000 and 8,000 and were made by a batch method in laboratory glassware in the following manner:

To a dry 2,000 ml. flask equipped with an agitator and connected to a source of dry nitrogen was placed 1.215 g. of a solution of 18.9% by weight of 8-oxabicyclo[4.3.0]nonane in dry tetrahydrofuran and chilled to −20° C. in an atmosphere of nitrogen. To this solution 29.5 ml. of fluosulfonic acid (4.0% by weight) was cautiously added with stirring and then warmed to 35° C. and maintained for varying lengths of time as indicated in Table II. The reaction was then terminated and the product recovered as described in Example 1.

Above Examples 1–8 serve to illustrate the process and the advantages compared with Examples A–M. The control of molecular weight and molecular weight distribution depends upon control of temperature, residence time, and initiator concentration. These three factors interact in a complex manner which makes it difficult to obtain narrow molecular weight distribution in copolymers at molecular weights below 2,500. It is possible to obtain compositions of narrow molecular weight distribution at various number average molecular weights at a given temperature and initiator concentration by simply varying the residence time or pumping rate of monomers. The number average molecular weight can also be varied widely by changing the initiator concentration while holding the residence time and temperature at constant values.

Useful compositions are preferably obtainable at mole fractions of the 8-oxabicyclo[4.3.0]nonanes between about 5 and 50 mole percent incorporated in the polymer. It is to be noted that only the trans form of the bicyclic ether enters into the copolymerization but it is not necessary to employ pure trans bicyclic ether since most of the cis isomer can be recovered unchanged and the presence of the cis isomer seems to have little influence on the course of the polymerization.

TABLE II.—BATCH COPOLYMERIZATION OF THF AND OBN

| Example No. | Temp., °C. | Reaction time, min. | Wt. percent OBN in copolymer | Percent conversion | $\{\eta\}$ | $\overline{M}_n$ |
|---|---|---|---|---|---|---|
| F | 35 | 100 | 18.7 | 47.2 | 0.498 | 5,340 |
| G | 35 | 100 | 19.9 | 48.1 | 0.520 | 6,620 |
| H | 35 | 100 | 20.3 | 58.0 | 0.472 | 6,550 |
| I | 35 | 75 | 18.5 | 32.3 | 0.522 | 5,630 |
| J | 35 | 125 | 18.5 | 40.6 | 0.523 | 7,600 |
| K | 35 | 85 | 19.9 | 40.6 | 0.493 | 6,300 |
| L | 35 | 110 | 20.6 | 36.7 | 0.500 | 7,120 |
| M | 35 | 110 | 21.8 | 40.4 | 0.509 | 7,120 |

NOTE.—Monomer composition in each example was 76.4 wt. percent tetrahydrofuran and 23.6 wt. percent 8-oxabicyclo[4.3.0]nonane containing 80% of the trans-isomer.

FIG. 1 is a log-log plot of a large number of lots of copolymer in which each point represents one lot of material located in terms of its number-average molecular weight and its inherent viscosity on the graph. The lower solid black line represents points obtained by plotting the $\{\eta\}$ vs. molecular weight of fractions of copolymer having very narrow molecular weight distribution and which were obtained by a fractionation process. From the standpoint of this invention this line provides a means for defining a series of new and improved polymer compositions.

As shown in said Ser. No. 239,684 it is evident that the products made at the short residence times have a lower $\{\eta\}$ than the material made at the longer residence time over the whole range of number-average molecular weights. The copolymers of Examples C, D and E illustrate normal (equilibrium) molecular weight distribution and lie outside of the region of narrow molecular weight distribution compositions. The other copolymers on the figure are all examples of narrow molecular weight distribution copolymers of various number average molecular weights described in the examples and within the scope of the invention.

As mentioned above, the improved TMG-OBN and/or MOBN copolymers of this invention can be advantageously employed as one of the glycol constituents in the manufacture of elastomeric polyesters.

The elastic and thermal properties and tensile strength depend to a large degree on the molecular weight and molecular weight distribution of the TMG copolymer which serves as a glycol. It is especially desirable to employ such a copolymer which has a narrow molecular weight distribution. It is sometimes advantageous to use a copolymer with a number-average molecular weight in the range from 2800 to 3600. If the molecular weight distribution is too broad, the composition will be heterogeneous. Discrete white particles may be seen with the unaided eye. When these particles are present in filaments, they cause weak spots at these sites. When TMG copolymer of a narrow molecular weight distribution is used, the composition is homogeneous and the weak spots in filaments are eliminated. A narrow molecular weight distribution then permits the use of a higher molecular weight TMG copolymer which results in a composition with improved heat resistance. This is due to the fact that fewer moles of the copolymer are used proportionately to the weight percent. The melting temperature and sticking temperature are affected by molal concentrations of the copolymer. As already mentioned above, the stress decay characteristics of the filaments are improved by using the improved TMG copolymers of the present invention.

From the preceding description it can be seen that this invention provides a composition of matter consisting essentially of a copolymer of a relatively narrow molecular weight distribution which is obtained by polymerizing the reactants with an appropriate catalyst and under appropriate conditions for a period of time less than that at which the percent deviation undergoes its abrupt increase in value. More specifically, this invention covers all copolymers which may be obtained by polymerizing tetrahydrofuran and OBN and/or MOBN for a period of time less than that required for the abrupt increase in $\delta$ to occur.

Thus this invention provides a composition of matter obtained by polymerizing THF and OBN and/or MOBN to produce a copolymer with a narrow molecular weight distribution whose limits may be defined in terms of its number-average molecular weight and its inherent viscosity as follows: a straight line is drawn between two points on a log-log chart. The first point represents a composition whose number-average molecular weight is 2000 and its inherent viscosity is 0.26. The second point represents a composition whose number-average molecular weight is 4500 and whose inherent viscosity is 0.45. This line is described by the equation $$\{\eta\} = 1.52 \times 10^{-3} M_n^{0.676}$$

in which $\{\eta\}$ is the inherent viscosity and $M_n$ is the number-average molecular weight. All compositions which lie on or below this line are within the scope of this definition of the invention.

This invention also provides a process for polymerizing THF and OBN and/or MOBN continuously in which a minor proportion of fluosulfonic acid (1 to 10 percent by weight) is premixed with the reactants at −20 to 20° C. The mixture is then conducted through a tube to a suitable reactor or vessel which is provided with means for controlling temperature. The temperature of the mass of material moving through the reactor is preferably maintained at some predetermined level between −5° and 55° C. The rate of flow of the liquid through the reactor is such that a volume of the liquid equal to the internal volume of the reactor, exclusive of the premixing chamber, traverses the reactor in less than one hour. The liquid reaction mixture is then rapidly conducted to a suitable reactor where it is mixed with steam or water to stop the reaction. The product may then be recovered by any suitable means.

More definitively stated, this invention provides an improved continuous process for the manufacture of a copolymer having a number-average molecular weight within the range of 1000 to 6000 and having a percent deviation of molecular weight of less than about 30 percent comprising the following steps: (1) continuously passing a reaction mixture of THF and OBN and/or MOBN and catalyst through a reaction zone having a length to diameter ratio of at least 50 at a temperature of from about −5° C. to about 55° C. and at a rate of flow such that the volume of said reaction mixture in said reaction zone traverses said reaction zone within from 2 to 60 minutes whereby said reactants polymerize, (2) mixing said reaction mixture with a catalyst neutralizer to stop polymerization, and (3) separating a copolymer of THF and OBN and/or MOBN from the remainder of said reaction mixture.

Since this process is necessarily limited to relatively low conversion for each traverse through the reactor (about 5 to 40 percent), the unreacted THF and OBN and/or MOBN from step (3) can be advantageously removed from the reaction mixture and recycled to step (1). The traverse time advantageously can be from 5 to 50 minutes and the amount of catalyst, preferably FSA, advantageously can be from about 0.5 percent to about 20 percent based on the weight of THF in the initial reaction mixture. The temperature during step (1) advantageously can be from about 35° to about 50° C. when using from 1 to 10 percent FSA in a reactor having an L./D. of at least 500. In many cases the time of traverse for step (1) can be less than 30 minutes.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. An improved continuous process for the manufacture of a copolymer of tetramethylene glycol and a member selected from the group consisting of 8-oxabicyclo[4.3.0]nonane and 3-methyl-8-oxabicyclo[4.3.0]nonane having a number-average molecular weight within the range of 1000 to 6000 and having a percent deviation of molecular weight of less than about 30 percent comprising the following steps: (1) continuously passing a reaction mixture of tetrahydrofuran and a member selected from the group consisting of 8-oxabicyclo[4.3.0]nonane and 3-methyl-8-oxabicyclo[4.3.0]nonane and catalyst through a reaction zone having a length to diameter ratio of at least 50 at a temperature of from about −5° C. to about 55° C. and at a rate of flow such that the volume of said reaction mixture in said reaction zone traverses said reaction zone within from 2 to 60 minutes whereby partial polymerization is accomplished, (2) mixing said reaction mixture with a catalyst neutralizer to stop polymerization, and (3) separating said copolymer from the remainder of said reaction mixture.

2. The process of claim 1 wherein said reaction mixture as described in step (3) is heated to remove unreacted tetrahydrofuran and a member selected from the group consisting of 8-oxabicyclo[4.3.0]nonane and 3-methyl-8-oxabicyclo[4.3.0]nonane which is recycled to step (1).

3. The process of claim 1 wherein the catalyst is fluosulfonic acid and the catalyst neutralizer is $H_2O$.

4. The process of claim 3 wherein said time of traverse in step (1) is from 5 to 50 minutes.

5. The process of claim 4 wherein the weight percent conversion to copolymer of tetrahydrofuran and a member selected from the group consisting of 8-oxabicyclo[4.3.0]nonane and 3-methyl-8-oxabicyclo[4.3.0]nonane in each traverse is from about 5 percent to about 40 percent.

6. The process of claim 3 wherein the amount of fluosulfonic acid is from about 0.5 to about 20 percent based on the weight of tetrahydrofuran and a member selected from the group consisting of 8-oxabicyclo[4.3.0]nonane and 3-methyl-8-oxabicyclo[4.3.0]nonane in the initial reaction mixture.

7. A composition of matter consisting essentially of a copolymer of tetramethylene glycol and a member selected from the group consisting of 8-oxabicyclo[4.3.0]nonane and 3-methyl-8-oxabicyclo[4.3.0]nonane produced by the process of claim 1.

References Cited

UNITED STATES PATENTS 3,381,038  4/1968  Lappin.

FOREIGN PATENTS 544,626  8/1957  Canada.

BERNARD HELFIN, Primary Examiner

U.S. Cl. X.R.

260—75